(12) United States Patent
Bock

(10) Patent No.: US 6,516,618 B1
(45) Date of Patent: Feb. 11, 2003

(54) GAS-TURBINE ENGINE WITH A BEARING CHAMBER

(75) Inventor: Alexander Bock, Zossen (DE)

(73) Assignee: Rolls-Royce Deutschland Ltd & Co. KG, Dahlewitz (CH)

( * ) Notice: Subject to any disclaimer, the term of this patent is extended or adjusted under 35 U.S.C. 154(b) by 0 days.

(21) Appl. No.: 09/715,039

(22) Filed: Nov. 20, 2000

(30) Foreign Application Priority Data

Nov. 26, 1999 (DE) .......................................... 199 56 919

(51) Int. Cl.[7] .................................................. F02C 7/12
(52) U.S. Cl. ........................................ 60/782; 60/39.08
(58) Field of Search ................................. 60/39.08, 782

(56) References Cited

U.S. PATENT DOCUMENTS

| | | | |
|---|---|---|---|
| 3,844,110 A | | 10/1974 | Widlansky |
| 4,502,274 A | * | 3/1985 | Girault ....................... 60/39.08 |
| 4,709,545 A | * | 12/1987 | Stevens ...................... 60/39.08 |
| 5,489,190 A | * | 2/1996 | Sullivan ...................... 415/175 |
| 5,813,214 A | * | 9/1998 | Moniz ....................... 60/39.08 |

FOREIGN PATENT DOCUMENTS

| | | |
|---|---|---|
| DE | 2408839 | 10/1974 |
| DE | 3826217 | 2/1990 |
| EP | 0127563 | 12/1984 |
| EP | 0752515 | 1/1997 |

* cited by examiner

Primary Examiner—Chud Gartenberg
(74) Attorney, Agent, or Firm—The Law Offices of Timothy J. Klima

(57) ABSTRACT

This invention relates to a gas-turbine engine which is provided in the turbine interior with a bearing chamber for a turbine shaft, the bearing chamber being sealed by sealing elements, and with a scavenge line for the lubricating oil which is supplied to the bearing chamber, in particular is sprayed onto the bearing(s) arranged therein. In accordance with the present invention, the single scavenge line, which is connected to a suitable lubricating-oil collecting compartment, features such an ample cross-section and the sealing elements have such a high sealing effect that the pressure in the bearing chamber is essentially equal to the pressure in the lubricating-oil-collecting compartment and maximally half the pressure in the turbine interior.

7 Claims, 1 Drawing Sheet

GAS-TURBINE ENGINE WITH A BEARING CHAMBER

Figure 1:
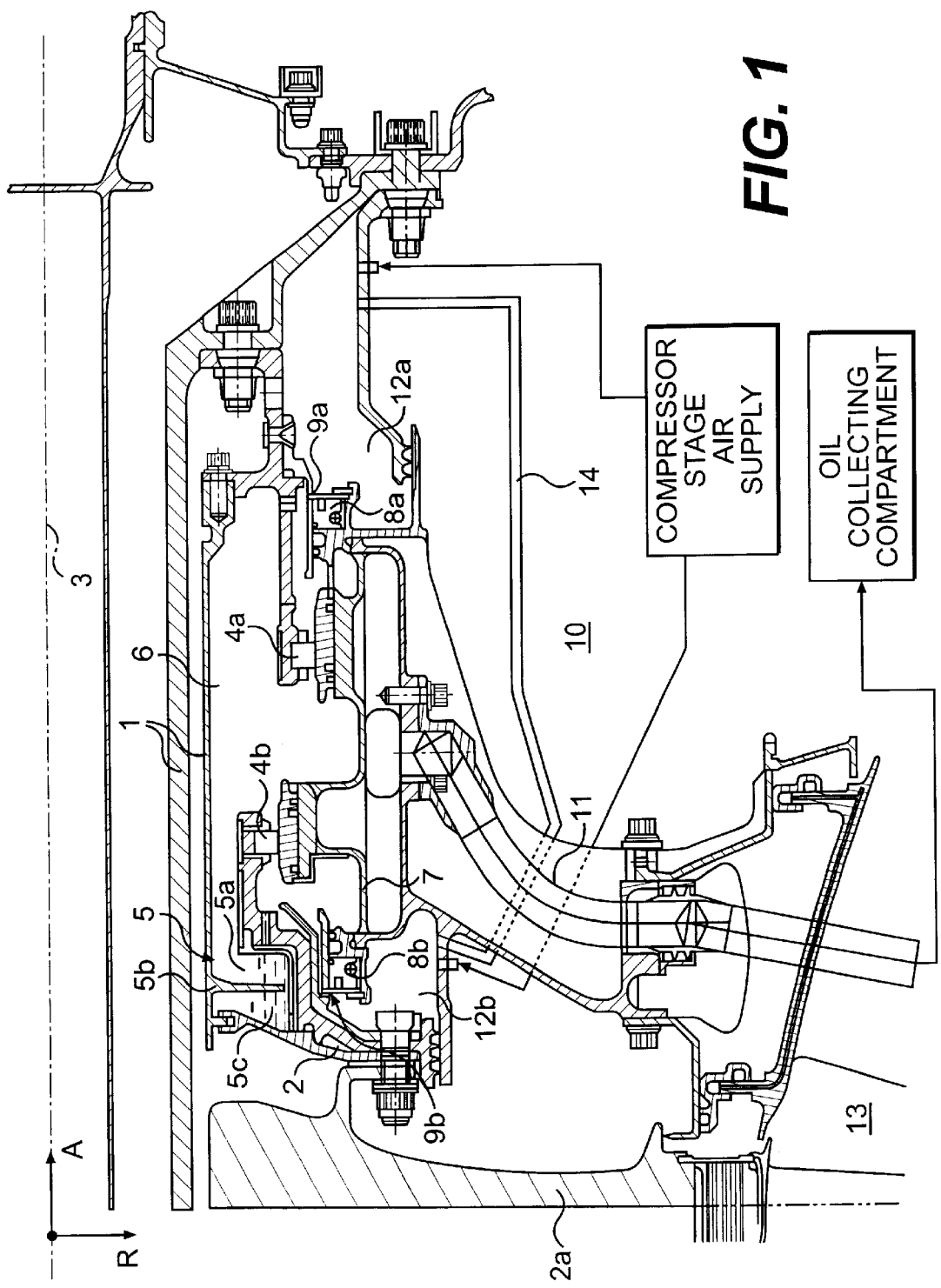

This invention relates to a gas-turbine engine which is provided in the turbine interior with a bearing chamber for a turbine shaft, the bearing chamber being sealed by sealing elements, and with a scavenge line for the lubricating oil which is supplied to the bearing chamber, in particular is sprayed onto the bearing(s) arranged therein. For background art, reference is made to Specification EP 0 127 563 B1, by way of example.

Various designs of bearing chambers for one or several shafts, in particular of an aircraft gas-turbine engine, are known in the prior art. Special measures are to be provided, in particular for the bearing chamber which is located on the hot turbine side of the engine, to preclude the bearing chamber lubricating oil from exiting into the turbine interior, this interior being filled with the relatively hot sealing air. Otherwise, the exiting lubricating oil could ignite in the turbine interior, in particular on the rotor disks of the turbine section of the gas-turbine engine carrying the turbine blades, thereby causing damage to these components. Therefore, a sealing-air system is usually provided on that side of each sealing element which faces away from the bearing chamber, this system consisting of a sealing-air chamber and a scavenge chamber. An airflow is supplied into the sealing-air chamber to create a pressure therein which is higher than the pressure in the adjacent scavenge chamber. The sealing airflow supplied to the sealing-air chamber as well as the sealing air supplied to the turbine interior are usually taken from a compressor stage of the compressor arranged upstream of the turbine section and the combustion chamber of the gas-turbine engine.

As is known (and as already mentioned), the bearing chambers of gas-turbine engines are continuously flown with lubricating oil, i.e. fresh or cooled lubricating oil is continuously sprayed onto the bearing(s) in the bearing chamber, this oil being thereafter scavenged from the bearing chamber and supplied to a lubricating-oil collecting compartment. Usually, several scavenge lines are provided for this purpose in the state of the art, these scavenge lines being connected to the mostly large-diameter annular bearing chamber in equal distribution about its circumference. The scavenge lines are routed from the bearing chamber through the turbine interior to an outside location, since the regeneration and the pumping of the oil for re-use can be accomplished at an outside location only. Due to this arrangement, the scavenge lines cross the flow pass of the engine, this pass carrying the hot working gas of the gas turbine burnt upstream in the engine combustion chamber.

If such a scavenge line broke in the area of this working-gas flow pass, hot working gas could theoretically enter the bearing chamber via this fracture, i.e. via the broken scavenge line. In the known state of the art, this situation is avoided by the pressure prevailing in the bearing chamber being set at least as high as the pressure prevailing in the flow pass in the area of crossing of the flow pass and the scavenge line, thereby ensuring that no positive pressure difference will be present between this section of the flow pass and the inner of the bearing chamber. This is achieved in that a small flow of air, upon being throttled at the said sealing elements, is continuously fed from the sealing-air chambers into the bearing chamber and in that orifices are provided in the scavenge line outside of the core of the gas-turbine engine.

The disadvantage of this design, however, lies in the fact that a relatively large sealing airflow is continuously required, i.e. sealing air must be taken from the compressor arranged upstream of the turbine section of the engine, this take-off impairing the overall efficiency of the gas-turbine engine. Moreover, the sealing-air systems with supply lines and vent ducts for the scavenge chambers entail a considerable construction effort.

In a broad aspect, the present invention provides a gas-turbine engine which is improved in the above respect in accordance with the generic part of claim 1.

It is a particular object of this invention to provide this improvement by appropriately sizing the cross-section of the single scavenge line connected to a suitable lubricating oil-collecting compartment and by providing sealing elements with such a high sealing effect that the pressure in the bearing chamber is essentially equal to the pressure in the lubricating-oil collecting compartment and maximally half the pressure in the turbine interior. Further arrangements and enhancements of this invention are cited in the subclaims.

An essential characteristic of this invention is that the pressure or the absolute pressure, respectively, prevailing in the bearing chamber under normal operating conditions of the engine is considerably lower than the pressure in the turbine interior in which the bearing chamber is arranged. By selection of suitable sealing elements with high sealing effect in the area of passage of the turbine shaft through the bearing chamber wall, a pressure level in the magnitude of 1.5 bar can be set in the bearing chamber, this pressure level amounting to only a third of the pressure value in the surrounding turbine interior. This pressure difference will preclude the lubricating oil from exiting the bearing chamber upon failure of a sealing element. Accordingly, no additional measures must be provided to preclude the lubricating oil exiting the bearing chambers from getting onto the turbine disks in the interior of the turbine.

These advantages are also obtained, or the disadvantages mentioned further above avoided to a considerable extent, if the absolute pressure in the bearing chamber amounts to maximally half the pressure in the turbine interior.

Said pressure difference between the bearing chamber and the turbine interior is achieved by arranging sealing elements with appropriately large sealing effect between these areas, by appropriately sizing the scavenge line returning the lubricating oil from the bearing chamber to a lubricating-oil-collecting compartment and by furnishing this scavenge line with an appropriately sized orifice, providing with these features that the pressure in the bearing chamber has essentially the same amount as the pressure in the lubricating-oil collecting compartment. Moreover, in terms of an advantageous combination of functions, this lubricating-oil collecting compartment can be a conventional accessory gearbox which is arranged outside of the engine casing forming the outer wall of the working-gas duct of the engine and which provides the accessory drives.

However, the previous measures could incur the hazard of a bearing chamber fire already described if one of the several scavenge lines usually provided in the prior art should break in the turbine interior in the area of the working-gas flow pass, in which case the hot working gas would enter the broken scavenge line at the fracture and be forced into the bearing chamber by the pressure difference and finally be discharged through another, sound scavenge line. Such a flow of hot turbine working gas through the bearing chamber would inevitably give rise to a bearing chamber fire. To avert this hazard, the provision of only a single scavenge line is now proposed in accordance with the present invention.

If this single scavenge line should break (generally an unlikely event), the hot working gas would also enter the bearing chamber, but only until the pressure in the bearing chamber and the pressure in said turbine interior are equal. Subsequently, the working gas will flow from the flow pass via the fracture through the scavenge line in the direction of the lubricating-oil collecting compartment, cooling down on the way to such a degree that the lubricating oil in the lubricating-oil collecting compartment will not be ignited. While a fire of the lubricating oil discharged from the bearing chamber via the (broken) scavenge line cannot be avoided, this fire is considered relatively uncritical since it takes place inside of the broken scavenge line, i.e. away from the area of the turbine disks. Even if the lubricating oil contained in the bearing chamber were ignited by the relatively small quantity of working gas entering the bearing chamber, the resultant fire would move into the single scavenge line according to this invention together with lubricating oil as it is scavenged from the bearing chamber.

Further objects and advantages of this invention will become apparent from the following detailed description of a preferred embodiment read in the light of the accompanying single figure showing a cross-section from a bearing chamber together with the respective environment of a gas-turbine engine in accordance with this invention. A particular feature here are the additional buffer chambers, one ahead of each of the two sealing elements of the bearing chamber, these buffer chambers being connected with each other by tubing (not shown). Since this connection equalizes the pressure in both buffer chambers, further safety is provided against the exit of oil upon failure of a seal. In this context, emphasis is put on the fact that the system is also operative without these buffer chambers.

This bearing chamber, as a further particular feature, provides for the arrangement of two bearings, one for the high-pressure turbine shaft and one for the low-pressure turbine shaft of the engine, this resulting in an extremely compact and simple design. However, this design requires a special sealing arrangement to be also provided between these two shafts to safely maintain the already mentioned pressure difference between the bearing chamber and the turbine interior known to contain sealing air. This special sealing arrangement between the two shafts can be designed in the form of a hydraulic seal of the siphon-type, as taught in the not prior published German Specification with the application number 199 16 803.2, for example. In this context, attention is drawn to the fact that all individual features of the preferred embodiment explained in the following can be essential for the invention.

Reference numeral 1 indicates the first turbine shaft and reference numeral 2 indicates the second turbine shaft of a two-shaft gas-turbine aero-engine, the shafts rotating at different speeds and obviously relative to each other (but preferably in the same sense of rotation) about the rotational axis 3 of this engine. As usual, these shafts 1, 2—of which only sections are shown—are arranged concentrically to each other, with the first turbine shaft 1, the low-pressure turbine shaft, being arranged in the inner of the second turbine shaft 2, the high-pressure turbine shaft. Moreover, reference numeral 2a indicates a portion of a turbine disk of the high-pressure turbine shaft 2.

The high-pressure turbine shaft 2 is carried in the area of its rearward end, i.e. in the turbine section of the gas-turbine engine, in a bearing 4b which is of the rolling-element floating type. Left of the pictorial representation, ahead of the turbine disk 2a. another turbine disk (optional), an engine combustion chamber (as usual) and the high-pressure turbine shaft 2 with the rotor disks of a high-pressure compressor of the gas-turbine engine are arranged in this sequence. Referring again to the pictorially represented area, the low-pressure turbine shaft 1, which extends beyond both sides of the illustration, is also carried in a bearing, the bearing 4a. The two bearings 4a, 4b are arranged in a common bearing chamber 6 which is confined by the turbine shafts 1, 2 on the one hand and by the stationary wall section 7 of the gas-turbine engine on the other hand. Obviously, this wall section 7—when viewed in the direction of the rotational axis 3, i.e. in the axial direction A of the engine—is an annulus enabling the annular roller bearings 4a, 4b to locate against the stationary wall section 7 with the full surface of their outer rings.

When viewed in the axial direction A, this wall section 7 is provided at is forward and its rearward end with a suitable location for a sealing element 8a or 8b, respectively, this location not being further indicated. These two sealing elements 8a, 8b, which are also annular, are designed as so-called radial segment seals and are arranged on a wall section 7 and on suitable surface sections of each of the two turbine shafts 1, 2, with the sealing element 8a sealing the annular gap 9a between the wall section 7 and the low-pressure turbine shaft 1 and with the sealing element 8b sealing the annular gap 9b between the wall section 7 and the high-pressure turbine shaft 2. Thus, the already mentioned bearing chamber 6 is sealed to the environment outside of the annular wall section 7 in the areas of these two sealing elements 8a, 8b.

As becomes apparent from the illustration, the support of two shafts 1, 2 in or by this bearing chamber 6 requires a further seal to be provided between these two turbine shafts 1, 2 to completely seal the bearing chamber 6 to the turbine interior 10. This seal is provided by the hydraulic sealing arrangement between the two shafts 1, 2 indicated with reference numeral 5 in its entirety. This hydraulic sealing arrangement, or a preferred embodiment thereof, is taught in detail in the not prior published German Patent Application with the application number 199 16 803.2 to which reference is expressly made herewith.

Summarizing, this hydraulic sealing arrangement 5 essentially consists of an annulus 5a which extends outwards about the circumference of the high-pressure turbine shaft 2 in the radial direction R and of a web 5b which again extends outwards about the circumference of the low-pressure turbine shaft 1 in the radial direction R and which projects into the annulus 5. A large part of the annulus 5a and, in particular, that partial area of it into which the free end of the web 5b projects is or will be filled with lubricating oil 5c from the engine lubricating circuit, actually with oil from the bearing chamber 6. Owing to the rotation of the two shafts 1, 2 and under the associated centrifugal effects, the lubricating oil 5c supplied to the bearing chamber 6 will also collect, as shown, against the inner wall of the high-pressure shaft 2, said inner wall lying radially outward relative to the space between the shafts 1 and 2. Thus, the lubricating oil 5c—again under centrifugal effect—is supplied into the annulus 5a provided on the shaft 2 which, when viewed in the radial direction R, lies considerably further outward than the area of the inner wall by which the lubricating oil 5c is supplied from the bearing chamber 6 to the hydraulic seal arrangement. In this process, the lubricating oil 5c collects in the annulus 5a to both the left and the right of the web 5b, thereby creating an optimum hydraulic seal of the siphon-type.

Attention is here drawn to the fact that the addition of the hydraulic sealing arrangement 5 as described here, or of any other type of sealing arrangement, to the two sealing elements 8a, 8b will only be required if two shafts 1, 2 are carried in or at a common bearing chamber 6, as shown here. However, if only a single shaft is associated with a bearing chamber, as shown in the example in the Specification EP 0 127563 B1 mentioned at the beginning, the two sealing elements 8a, 8b will, of course, be sufficient to effect a complete seal of the bearing chamber 6 to the environment or the turbine interior, respectively.

As already mentioned, lubricating oil from the engine oil circuit is continuously supplied to the bearing chamber 6 for lubrication and, in particular, for cooling of the two bearings 4a, 4b. For this purpose, the lubricating oil is splashed onto the bearings 4a, 4b in a manner which is not further illustrated here. Obviously, this supply of oil must be removed continuously from the bearing chamber 6. For this purpose, a scavenge line 11 is connected to the bearing chamber 6 with one end, and to a lubricating-oil collecting compartment (not shown) with its other end (also not shown). This collecting compartment can be the accessory gearbox, i.e. the gearbox of the gas-turbine engine, as explained ahead in the introductory section of this Specification.

As already detailed in the introductory section of this Specification, the bearing chamber 6 must be sealed to the environment as completely as possible to prevent lubricating oil from the bearing chamber 6 from leaking into the turbine interior 10. To absolutely ensure the sealing function of the sealing elements 8a, 8b, a buffer chamber, 12a or 12b respectively, is therefore arranged ahead of each of these sealing elements on their side facing away from the bearing chamber 6. The two buffer chambers 12a, 12b are connected by tubing not illustrated here to equalize the pressure within them. In the case of a failure of a sealing element 8a or 8b, this measure prevents the pressure in the bearing chamber 6 from rising to such an extent that a change of the pressure direction in the other, intact sealing element 8b or 8a will occur, which may cause oil to leak via this sealing element. As usual, an airflow is supplied to the buffer chamber 12a, 12b, this airflow being tapped from a compressor stage of the compressor (not shown) arranged upstream of the turbine section and the combustion chamber of the gas-turbine engine.

As explained further above ahead of the description of the preferred embodiment, the pressure or the absolute pressure, respectively, prevailing in the bearing chamber 6 under normal operating conditions of the engine will be considerable lower than the pressure in the turbine interior 10 which, among other, contains the bearing chamber 6 and the turbine disks. For example, the absolute pressure in the turbine interior 10 and in the buffer chambers 12a, 12b may be in the range of 4 to 4.5 bar. If the sealing effect of the sealing elements 8a, 8b is high (the hydraulic sealing arrangement being absolutely tight against the passage of air, anyway), a pressure level in the magnitude of 1.5 bar may be set in the bearing chamber 6, which amounts to only a third of the pressure value in the buffer chambers 12a, 12b in the turbine interior 10. Accordingly, any exit of lubricating oil from the bearing chamber 6 is excluded even if a sealing element 8a or 8b should fail.

However, the said pressure difference between the bearing chamber 6 and the turbine interior 10 or the buffer chambers 12a, 12b, respectively, is not only effected by the provision of sealing elements 8a, 8b with appropriately high sealing effect but also by the scavenge line 11 returning the lubricating oil from the bearing chamber 6 into the already mentioned lubricating-oil collecting compartment, this scavenge line being designed with a cross-section or an orifice, respectively, which is appropriately sized to ensure that the amount of pressure prevailing in the bearing chamber 6 will essentially be equal to that in the lubricating-oil-collecting compartment.

As illustrated, the scavenge line 11 is routed through the turbine interior 10 to the outside. Should this scavenge line 11 fail, an event which is unlikely, anyway, in the area of the partially shown flow pass 13 carrying the hot turbine working gas, only a small quantity of hot working gas will get from the flow pass 13 into the bearing chamber 6. As already explained in the introductory section of this Specification, this quantity is extremely small since (in the meaning of a feature essential for the invention) only a single such scavenge line 11 is provided (apparently for a single bearing chamber 6). Accordingly, in the event of a failure of this single scavenge line 11, the hot working gas will enter the bearing chamber 6 just until the pressure in the bearing chamber 6 is equal to that in the flow pass 13. Subsequently, the working gas will flow via the fracture in the scavenge line 11 and through this scavenge line 11 in the direction of the lubricating-oil collecting compartment, cooling down on the way to such a degree that the lubricating oil in the lubricating-oil collecting department is not ignited. While a fire of the lubricating oil fed from the bearing chamber 6 through the (broken) scavenge line 11 cannot be avoided, this fire is, however, considered relatively uncritical since it takes place inside the broken scavenge line 11, i.e. away from the area of the turbine interior 10.

In this context, a further benefit of the gas-turbine engine according to the present invention is the rapid and easy detectability of a failure of the scavenge line 11. The pressure rise in the bearing chamber 6 resulting from such a failure, as already described herein, will be imparted to the lubricating oil pressure, this pressure being permanently monitored. Therefore, the gas-turbine engine described herein is as safe as the known state of the art in terms of bearing chamber fire or failure of the scavenge line 11, while being characterized by a favorable, relatively low pressure in the bearing chamber under normal operating conditions. Attention is drawn to the fact that apparently a plurality of modifications, in particular those of design, other than those described may be made to the embodiment here shown without departing from the inventive concept.

List of references

1 Low-pressure turbine shaft
2 High-pressure turbine shaft
3 Rotational axis
4a Bearing (of 1)
4b Bearing (of 2)
5 Hydraulic seal arrangement
5a Annulus
5b Web
5c Lubricating oil
6 Bearing chamber
7 Wall section
8a,b Sealing element
9a,b Annular gap
10 Turbine interior
11 Scavenge line
12a,b Buffer chamber
13 Working-gas flow pass
A Axial direction
B Radial direction

What is claimed is:

1. A method for preventing lubricating oil from a turbine shaft bearing chamber of a gas-turbine engine from escaping into an interior portion of the engine carrying turbine blades, comprising:

pressure sealing an interior of the bearing chamber from the interior portion of the engine carrying the turbine blades;

providing a single scavenge line between the interior of the bearing chamber and a lubricating oil collecting compartment to scavenge lubricating oil supplied to the interior of the bearing chamber and convey the lubricating oil to the lubricating oil collecting compartment; and sizing the scavenge line so that a pressure in the interior of the bearing chamber is essentially equal to a pressure in the lubricating oil collecting compartment and maximally half a pressure in the interior portion of the engine carrying the turbine blades.

2. The method as in claim 1 and further comprising:

providing a buffer chamber between at least one seal of the bearing chamber and the interior portion of the engine carrying the turbine blades; and supplying the buffer chamber with compressed air at a pressure greater than the pressure in the bearing chamber.

3. The method as in claim 2 and further comprising:

providing a first buffer chamber between a first seal of the bearing chamber and the interior portion of the engine carrying the turbine blades;

providing a second buffer chamber between a second seal of the bearing chamber and the interior portion of the engine carrying the turbine blades;

supplying the buffer chambers with compressed air at a pressure greater than the pressure in the bearing chamber; and connecting the two buffer chambers with a tube to equalize pressures within the buffer chambers.

4. A gas-turbine engine, comprising:

a bearing chamber for a turbine shaft of the engine;

at least one sealing element sealing an interior of the bearing chamber from an interior portion of the engine carrying turbine blades;

a scavenge line interconnecting the interior of the bearing chamber and a lubricating oil collecting compartment for scavenging oil from the bearing chamber to the lubricating oil collecting compartment; the scavenge line having sufficient size to prevent a substantive pressure differential between the interior of the bearing chamber and the lubricating oil collecting compartment during engine operation.

5. The gas-turbine engine of claim 4, and further comprising:

first and second bearings positioned in the bearing chamber, the first bearing for supporting a high pressure turbine shaft of the engine and the second bearing for supporting a low pressure turbine shaft of the engine, the high pressure turbine shaft being positioned radially outside the low pressure turbine shaft and including an annulus extending radially outward from a rotational axis of the shafts; the low pressure turbine shaft including a radially outwardly projecting web positioned in the annulus of the high pressure turbine shaft;

a line connecting the bearing chamber and the annulus for supplying oil from the bearing chamber to the annulus;

a quantity of oil positioned in the annulus during operation of the engine to provide a hydraulic seal between the annulus of the high pressure turbine shaft and web of the low pressure turbine shaft.

6. The gas-turbine engine of claim 5 and further comprising:

a buffer chamber positioned between at least one sealing element of the bearing chamber and the interior portion of the engine carrying the turbine blades; and a source of air pressurized to a pressure greater than a pressure in the bearing chamber connected to the buffer chamber for supplying the buffer chamber with compressed air at a pressure greater than the pressure in the bearing chamber.

7. The gas-turbine engine of claim 6 and further comprising:

a first buffer chamber positioned between a first sealing element of the bearing chamber and the interior portion of the engine carrying the turbine blades;

a second buffer chamber positioned between a second sealing element of the bearing chamber and the interior portion of the engine carrying the turbine blades; and a tube connecting the two buffer chambers for equalizing pressures between the buffer chambers.

* * * * *